(12) United States Patent
Kim

(10) Patent No.: US 12,109,928 B2
(45) Date of Patent: Oct. 8, 2024

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 219 days.

(21) Appl. No.: 17/868,246

(22) Filed: Jul. 19, 2022

(65) Prior Publication Data

US 2023/0173968 A1    Jun. 8, 2023

(30) Foreign Application Priority Data

Dec. 8, 2021  (KR) .......................... 10-2021-0174924

(51) Int. Cl.
| | |
|---|---|
| *G05G 5/28* | (2006.01) |
| *B60N 3/06* | (2006.01) |
| *B60R 21/09* | (2006.01) |
| *B60T 7/04* | (2006.01) |
| *G05G 5/00* | (2006.01) |

(52) U.S. Cl.
CPC .............. *B60N 3/063* (2013.01); *B60R 21/09* (2013.01); *B60T 7/042* (2013.01); *G05G 5/005* (2013.01); *G05G 5/28* (2013.01)

(58) Field of Classification Search
CPC ............ G05G 1/305; G05G 1/36; G05G 1/40; G05G 1/405; B60T 7/06; B60T 7/065; B60K 2026/026
See application file for complete search history.

(56) References Cited

U.S. PATENT DOCUMENTS

| | | | | |
|---|---|---|---|---|
| 1,385,479 A | * | 7/1921 | Stanley ................ | B60R 25/005 70/203 |
| 1,442,203 A | * | 1/1923 | Williams .............. | B60R 25/005 70/202 |

(Continued)

FOREIGN PATENT DOCUMENTS

| | | | | |
|---|---|---|---|---|
| EP | 3229097 A1 | * | 10/2017 | ............. B60K 23/02 |
| FR | 3007366 A1 | * | 12/2014 | ............. B60T 13/74 |

(Continued)

OTHER PUBLICATIONS

USPTO Machine Translation (retrieved from FIT database) of the Description of FR 3007366 A1, Kohl et al., Dec. 26, 2014. (Year: 2024).*

*Primary Examiner* — Daniel D Yabut
(74) *Attorney, Agent, or Firm* — Morgan, Lewis & Bockius LLP

(57) ABSTRACT

A foldable pedal apparatus for a vehicle, turns into a pop-up state in which a pedal pad protrudes to the interior of the vehicle to be exposed toward a driver in the manual driving mode in which the driver is actively engaged in driving and a hide state in which the pedal pad is pushed behind a center fascia panel so that exposure toward the driver is blocked in the autonomous driving mode in which the driver is not actively engaged in driving, wherein a pressure-operated or liner motion signal generating portion generates a signal relating to a pedal function during manipulation of the pedal pad.

19 Claims, 10 Drawing Sheets

(56) References Cited

U.S. PATENT DOCUMENTS

| | | | | |
|---|---|---|---|---|
| 6,182,525 B1* | 2/2001 | Bowers | ............... | B60K 23/02 |
| | | | | 180/274 |
| 6,408,712 B1* | 6/2002 | Bolisetty | ............... | G05G 1/405 |
| | | | | 74/514 |
| 10,889,226 B1* | 1/2021 | Dean | ............... | B60T 7/06 |
| 2003/0067215 A1* | 4/2003 | Rieth | ............... | G05G 1/38 |
| | | | | 303/20 |
| 2019/0310678 A1* | 10/2019 | Wojciechowski | ... | B60K 26/021 |
| 2020/0348712 A1* | 11/2020 | Schern | ............... | F16P 1/00 |
| 2020/0398725 A1* | 12/2020 | Mullen | ............... | B60N 3/044 |
| 2021/0149432 A1* | 5/2021 | Neubauer | ............... | B60T 7/042 |
| 2022/0001843 A1* | 1/2022 | Michael | ............... | B60T 7/042 |

FOREIGN PATENT DOCUMENTS

| | | | | |
|---|---|---|---|---|
| GB | 2347660 A | * | 9/2000 | ......... B60R 25/005 |
| KR | 10-2017-0137427 A | | 12/2017 | |
| WO | WO-2019007840 A1 | * | 1/2019 | |

\* cited by examiner

FOLDABLE PEDAL APPARATUS FOR VEHICLE

CROSS REFERENCE TO RELATED APPLICATION

The present application claims priority to Korean Patent Application No. 10-2021-0174924, filed Dec. 8, 2021, the entire contents of which is incorporated herein for all purposes by this reference.

BACKGROUND OF THE PRESENT DISCLOSURE

Field of the Present Disclosure

The present disclosure relates to a foldable pedal apparatus for a vehicle in which a pedal pad protrudes to be exposed toward a driver so that the pedal assembly is manipulable by the driver in a manual driving mode in which the driver is actively engaged in driving, and in which the pedal pad is hidden so that exposure toward the driver is blocked so that the pedal assembly is not manipulable by the driver in an autonomous driving mode.

Description of Related Art

Autonomous driving vehicles are smart vehicles adopting autonomous driving technology that allows the vehicle to reach a destination on its own without active manipulations of the steering wheel, accelerator pedal, and brake by a driver and has been rapidly developed recently.

When autonomous driving is universally realized, the driver may choose between a manual driving mode in which the driver is actively engaged in driving and an autonomous driving mode in which the vehicle travels to a destination on its own without active engagement in driving by the driver.

Because the driver needs to rest comfortably with his feet stretched in the autonomous driving mode, that pedals (accelerator pedal, brake pedal) positioned in a space below the driver's seat would interfere with the driver's rest if exposed to the interior in the space below the driver's seat poses a disadvantage.

Furthermore, if the driver manipulates pedals (accelerator pedal, brake pedal) of the vehicle in an autonomous driving mode in which the driver does not manipulate the pedals, the vehicle control apparatus determines that the driver wants to terminate the autonomous driving and be actively engaged in driving and terminates the control for autonomous driving.

However, because the vehicle pedals are provided to be exposed in the space below the driver's seat, there is a concern that the driver may inadvertently press the pedals in the autonomous driving mode (a case of a faulty pedal manipulation). In such a case, there is a risk of accident depending on the situation on the road, the distance between vehicles, or the like.

Accordingly, there is a demand for technical development for a pedal apparatus in which the pedal pad protrudes to be exposed toward a driver so that the pedal assembly is manipulable by the driver in the manual driving mode in which the driver is actively engaged in driving, and in which exposure of the pedal pad is blocked so that the pedal assembly is not manipulable by the driver in the autonomous driving mode for the comforting rest of the driver and safety by blocking faulty manipulation.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus in which a pedal pad protrudes to be exposed (pop up) toward a driver so that the pedal assembly is manipulable by the driver in a manual driving mode in which the driver is actively engaged in driving, and the pedal pad is hidden so that exposure toward the driver is blocked so that the pedal assembly is not manipulable by the driver in an autonomous driving mode, allowing a comforting rest of the driver in the autonomous driving mode and improving safety by blocking a faulty manipulation of the pedal in the autonomous driving mode.

Various aspects of the present disclosure are directed to providing a foldable pedal apparatus configured with a pressure-operated pedal apparatus or liner motion pedal apparatus, cutting cost by reducing the number of parts and downsizing through a compact configuration.

According to various exemplary embodiments of the present disclosure for achieving the objects described above, a foldable pedal apparatus for a vehicle includes a pedal arm rotatably provided in the footrest panel, a pedal assembly provided in the pedal arm and operated by the manipulation of a driver, and a signal generating portion provided in the pedal assembly to generate a signal relating to a pedal function during the operation of the pedal assembly, wherein the foldable pedal apparatus turns into a hide state in which the pedal assembly is not manipulable by the driver when the pedal assembly is covered by a center fascia panel by a rotation of the pedal arm, and a pop-up state in which the pedal assembly is manipulable by the driver when the pedal assembly is exposed from a center fascia panel by the rotation of the pedal arm.

The center fascia panel is rearwardly spaced from the footrest panel; and a support lever is provided on the center fascia panel to protrude toward the footrest panel and be elastically rotatable via a lever spring, wherein the foldable pedal apparatus turns into the hide state in which the pedal assembly is not manipulable by the driver when the pedal arm rotates upward to be supported by the support lever.

The foldable pedal apparatus turns into the pop-up state in which the pedal assembly is manipulable by the driver when the pedal arm rotates downwardly in the hide state to be detached from the support lever.

A motor fixed to the footrest panel and coupled to the pedal arm to rotate the pedal arm during operation may be further included.

The pedal arm includes a rotation portion connected to a motor at an upper end portion thereof, a support portion bending from the rotation portion to contact and be supported by a floor of the footrest panel when the pedal assembly is in the pop-up state, and a pair of shaft portions which respectively protrude right and left at a connecting point between the rotation portion and support portion and to which the pedal assembly is operably coupled.

The support lever is provided to be rotatable via the spring lever in the center fascia panel, wherein the foldable pedal apparatus turns into the hide state in which the pedal assembly is not manipulable by the driver when the pedal arm rotates upward so that the support portion is supported by the support lever.

The support lever is provided to be rotatable via the spring lever in the center fascia panel, wherein the foldable pedal apparatus turns into the pop-up state in which the pedal assembly is manipulable by the driver when the pedal arm rotates downward so that the support portion is supported by the floor of the footrest panel.

The pedal assembly includes two assemblies that have identical configurations and that are spaced from each other right and left of the pedal arm. of the two pedal assemblies, one assembly is a pedal assembly of accelerator pedal apparatus generating a signal relating to the acceleration during the manipulation by the driver, and the other assembly is a pedal assembly of brake pedal apparatus generating a signal relating to the braking.

The pedal assembly includes two assemblies that have identical configurations and that are respectively coupled to the shaft portions. The pedal assembly coupled to the right shaft portion is a pedal assembly of the accelerator pedal apparatus generating a signal relating to the acceleration during the manipulation by the driver, and the pedal assembly coupled to the left shaft portion is a pedal assembly of the brake pedal apparatus generating a signal relating to the braking.

The pedal assembly includes a pedal pad fitted over the shaft portion to be manipulated by the driver, and a return spring supported by the shaft portion and the pedal pad to elastically support the pedal pad, wherein the pedal pad is manipulated to move straight in the manipulation direction of the driver.

The pedal pad includes a manipulation portion which is a part manipulated by the driver and by which the return spring is supported at one end portion, and a housing portion connected to the manipulation portion and fitted over the shaft portion to move straight with respect to the shaft portion during the manipulation of the manipulation portion.

The shaft portion and the housing portion have elliptical cross-sectional shapes, and the major axes extend in the manipulation direction of the pedal pad, wherein the major axis of the elliptical cross-section of the housing portion is greater than the major axis of the elliptical cross-section of the shaft portion so that the housing portion may move straight with respect to the shaft portion during the manipulation of the manipulation portion.

The signal generating portion includes a pressure sensor fixed to the shaft portion to generate an electrical signal upon contacting with the manipulation portion in response to the manipulation of the pedal pad, and a printed circuit board (PCB) fixed to the shaft portion to generate a signal relating to the pedal function upon receiving the electrical signal of the pressure sensor.

The return spring is supported by the manipulation portion at a first end portion of the return spring and supported by the shaft portion at a second end portion of the return spring through the pressure sensor and is provided such as not to interfere with the pressure sensor.

An air gap is provided between the manipulation portion of the pedal pad and the pressure sensor, a depth of the air gap being predetermined based on non-manipulation of the pedal by the driver.

The signal generating portion includes a permanent magnet coupled to the manipulation portion of the pedal pad, and a printed circuit board (PCB) coupled to the shaft portion to face the permanent magnet, wherein the PCB recognizes changes in magnetic flux of the permanent magnet when the pedal pad moves caused by the manipulation by the driver and generates a signal relating to the pedal function of the vehicle.

The PCB is inserted into the shaft portion, and a cover sealing an opening hole of the shaft portion is coupled to one end portion of the shaft portion to prevent detachment of the PCB from the shaft portion.

The support portion of the pedal arm extends in the direction closest to the operating direction of the pedal assembly when the support portion of the pedal arm contacts with and is supported by the floor of the footrest panel.

According to an exemplary embodiment of the present disclosure, the foldable pedal apparatus according to an exemplary embodiment of the present disclosure is configured to turn into a pop-up state in which the pedal pad moves up to protrude to the interior of the vehicle and be exposed toward the driver so that the pedal assembly is manipulable by the driver in a manual driving mode in which the driver is actively engaged in driving and turns into a hide state in which the pedal pad is pushed behind the center fascia panel so that exposure toward the driver is blocked so that the pedal assembly is not manipulable by the driver in an autonomous driving mode in which the driver is not actively engaged in driving, having the effect that the driver may rest in comfort in the autonomous driving mode, and furthermore, that safety may be improved by blocking a faulty manipulation of the pedal in the autonomous driving mode.

Furthermore, according to an exemplary embodiment of the present disclosure, the foldable pedal apparatus is configured to generate a signal relating to the pedal function using the pressure-operated sign generating portion or liner motion sign generating portion, having the effect of promoting a cost cut by decreasing the number of parts and downsizing through a compact configuration.

Furthermore, according to an exemplary embodiment of the present disclosure, the foldable pedal apparatus is configured to perform a pop-up operation and a hide operation using the pedal arm rotating with respect to the footrest panel and the support lever provided in the center fascia panel, having the effect that the interior of the vehicle may be maximized by minimizing the space required for the pop-up operation and that the high-tech image may be heightened at the time of pop-up operation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
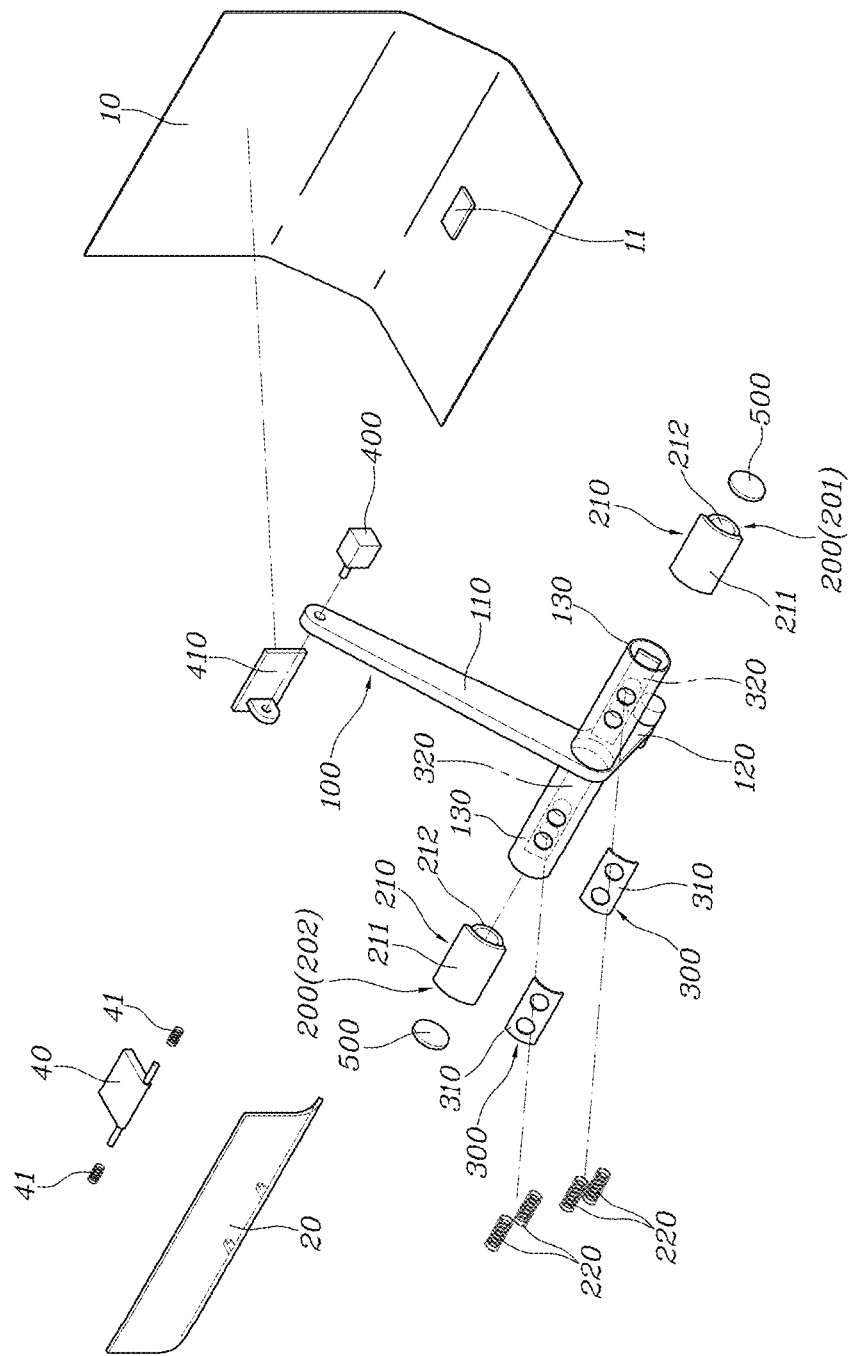
FIG. 1 is an exploded perspective view of a pressure-operated foldable pedal apparatus according to an exemplary embodiment of the present disclosure

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the embodiments of the present disclosure included in the exemplary embodiment or application existed by way of examples only for describing the embodiments according to an exemplary embodiment of the present disclosure, and the exemplary embodiments of the present disclosure may be implemented in various forms and are not to be construed as being limited to the embodiments described in the exemplary embodiment or application.

Since the exemplary embodiment of the present disclosure may be modified in various ways and have various forms, specific embodiments will be illustrated in the drawings and described in the exemplary embodiment or application. However, this is not intended to limit the embodiments according to the concept of the present disclosure to the specific forms and is to be construed as including all modifications, equivalents, and substitutes included in the spirit and technical scope of the present disclosure.

Terms such as first and/or second may be used to describe various components, but the components are not to be limited by the terms. The terms only serve the purpose of distinguishing one component from other components. For example, the first component may be referred to as the second component, and similarly, the second component may also be referred to as the first component without deviating from the scope of the right according to the concept of the present disclosure.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present. Other expressions describing the relationship between components such as "between" and "just between", or "adjacent to" and "directly adjacent to" are to be interpreted in the same manner.

The terms used herein are used for describing various exemplary embodiments only and are not intended to limit the present disclosure. Singular expressions include plural expressions unless the context explicitly indicates otherwise. In the exemplary embodiment, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which an exemplary embodiment of the present disclosure pertains. It will be further understood that terms, such as those defined in commonly used dictionaries, is to be interpreted as having a meaning which is consistent with their meaning in the context of the exemplary embodiment and will not be interpreted in an idealized or overly formal sense unless expressly so defined herein.

A control unit (controller) according to various exemplary embodiments of the present disclosure may be implemented through a processor configured to perform operations to be described below using an algorithm configured to control the operations of various components of a vehicle or a nonvolatile memory configured to store data relating to software commands for reproducing the algorithm and the data stored in the memory. Here, the memory and the processor may be implemented as individual chips. Alternatively, the memory and the processor may be implemented as a single integrated chip. The processor may take the form of one or more processors.

In the following, a foldable pedal apparatus for a vehicle according to various exemplary embodiments of the present disclosure will be described with reference to the accompanying drawings.

According to an exemplary embodiment of the present disclosure, as illustrated in FIGS. 1 to 10, a foldable pedal apparatus includes, a pedal arm 100 rotatably provided in a footrest panel 10 located in a space below a driver's seat, a pedal assembly 200 provided in the pedal arm 100 and operated by the manipulation of a driver, and a signal generating portion 300 provided in the pedal assembly 200 to generate a signal relating to a pedal function while operating in a pressure type or a linear mobility type during the operation of the pedal assembly 200.

Figure 2:
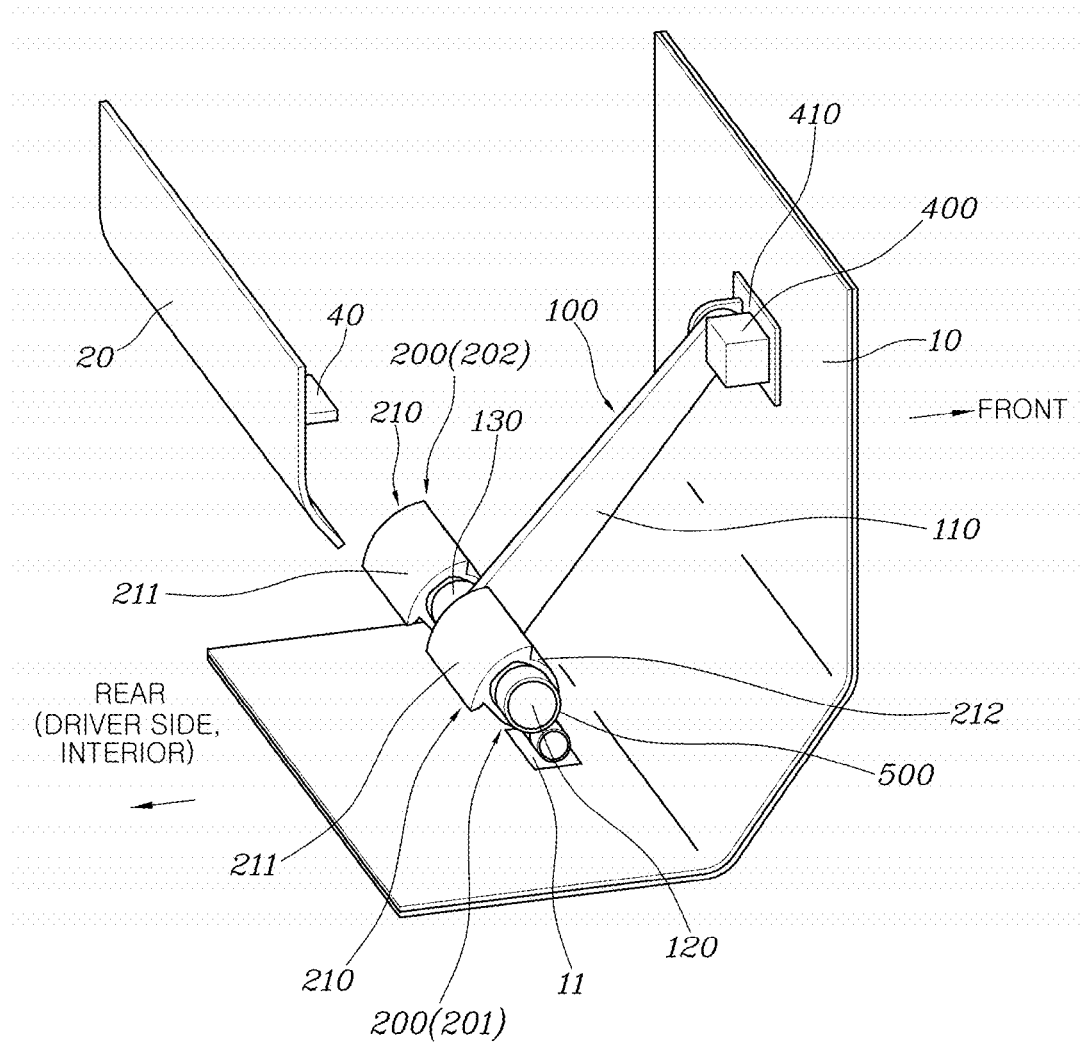
FIG. 2 is a view of the pressure-operated foldable pedal apparatus in FIG. 1 in an assembled state with a pedal pad exposed to an interior of a vehicle in a pop-up state.
Figure 3:
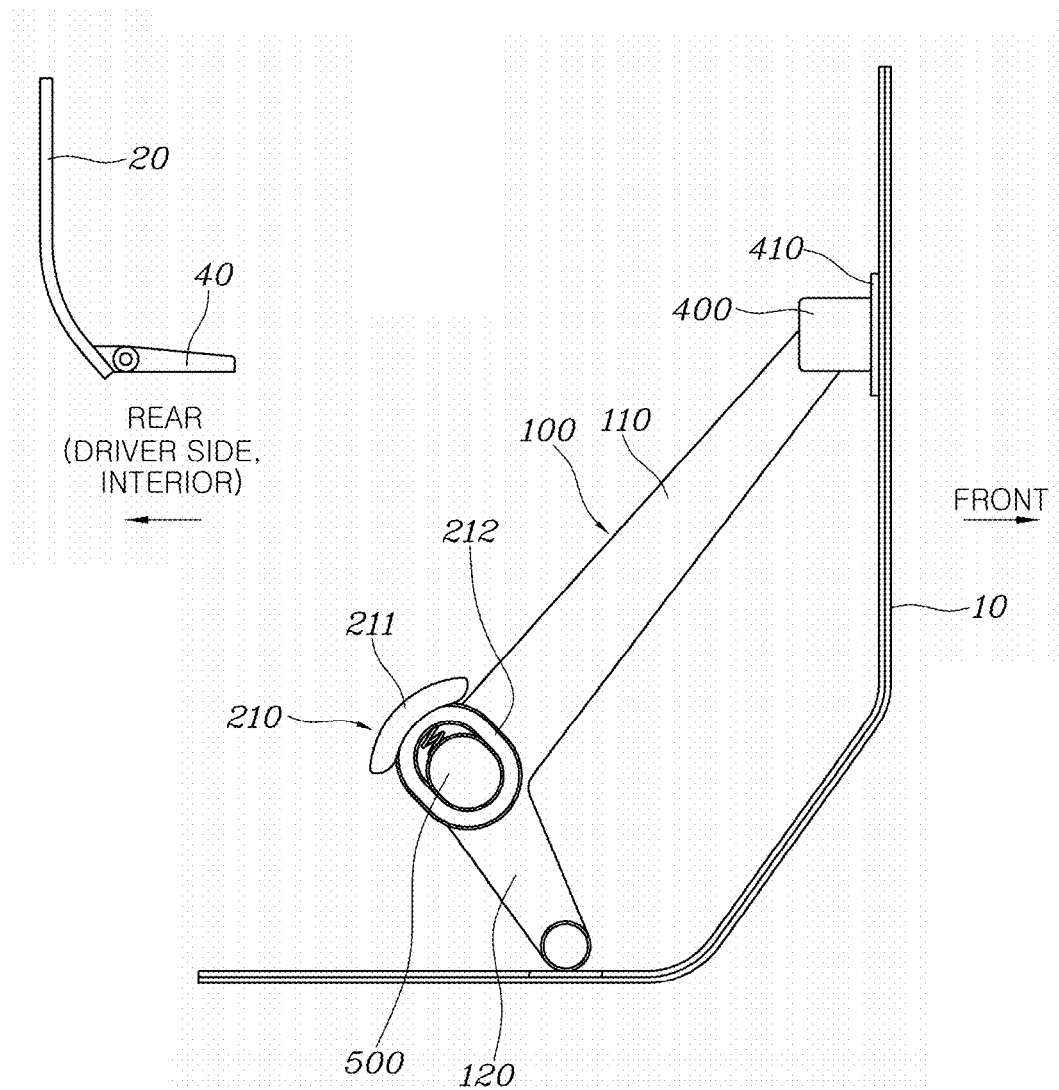
FIG. 3 is a side view of the foldable pedal apparatus in FIG. 2.

The foldable pedal apparatus turns into a hide state in which the pedal assembly is not manipulable by the driver 200 when the pedal assembly 200 is covered by the center fascia panel 20 by the rotation of the pedal arm 100 (refer to FIG. 4), and a pop-up state in which the pedal assembly is manipulable by the driver 200 when the pedal assembly 200 is exposed from the center fascia panel 20 by the rotation of the pedal arm 100 (refer to FIG. 2 and FIG. 3).

Figure 4:
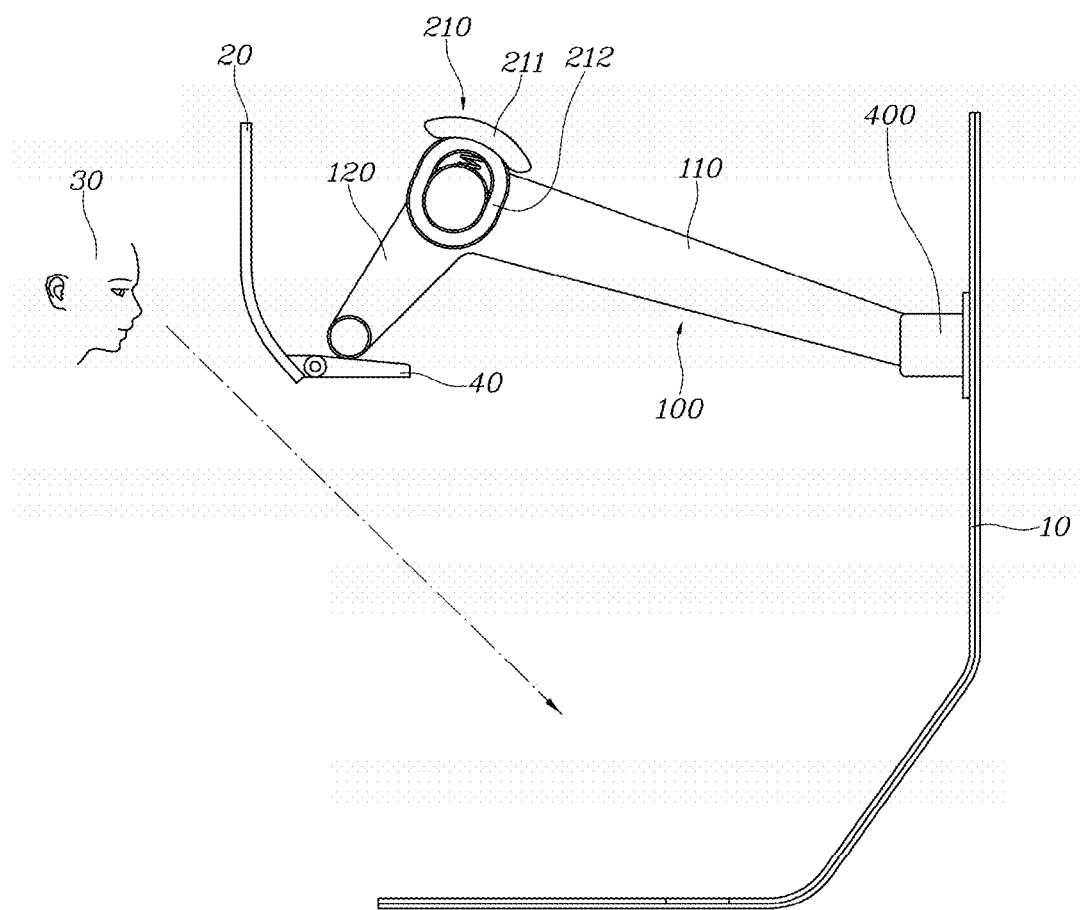
FIG. 4 is a view of a hide state in which the pedal pad is hidden into a center fascia panel by a rotation of the pedal arm from FIG. 3
Figure 5:
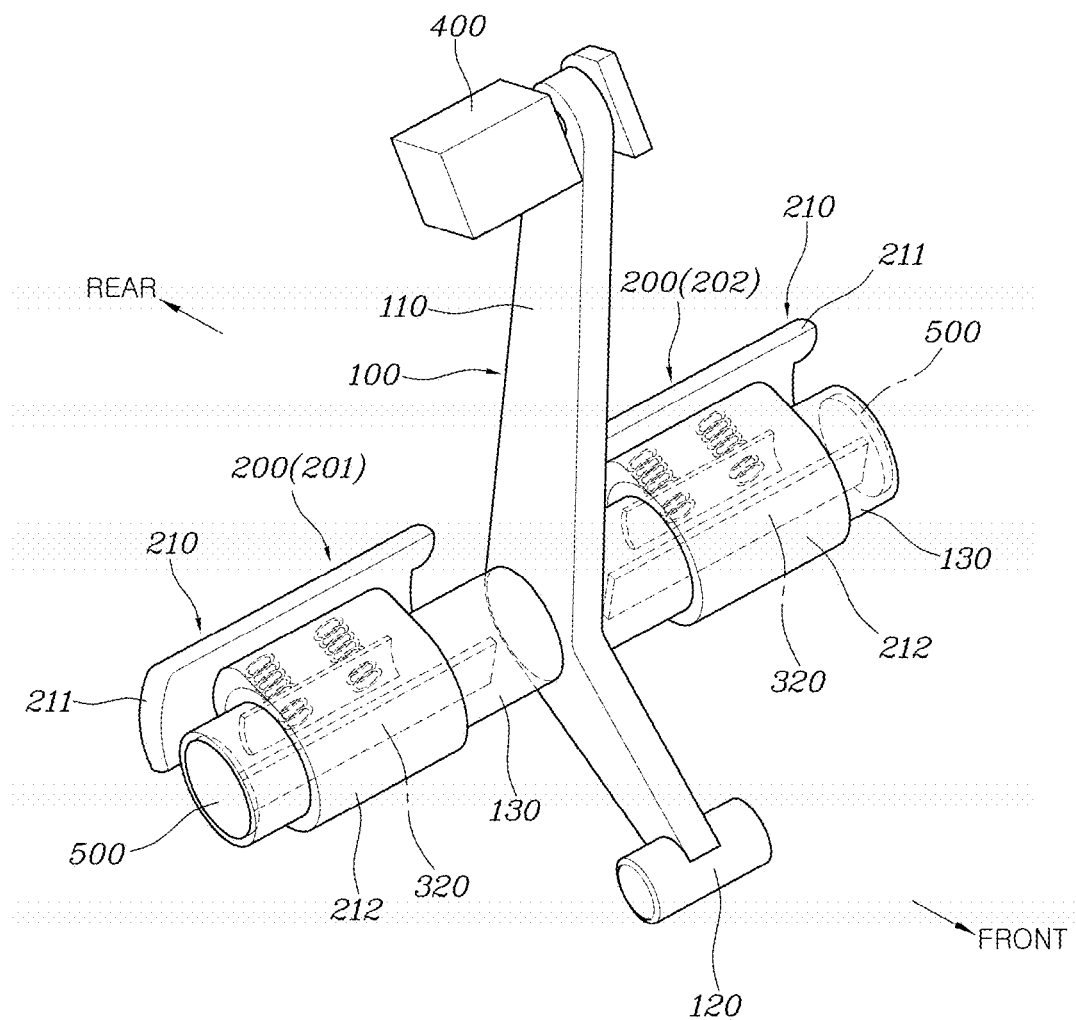
FIG. 5 is a view exemplarily illustrating a pedal arm in FIG. 2 viewed from the front side thereof.
Figure 6:
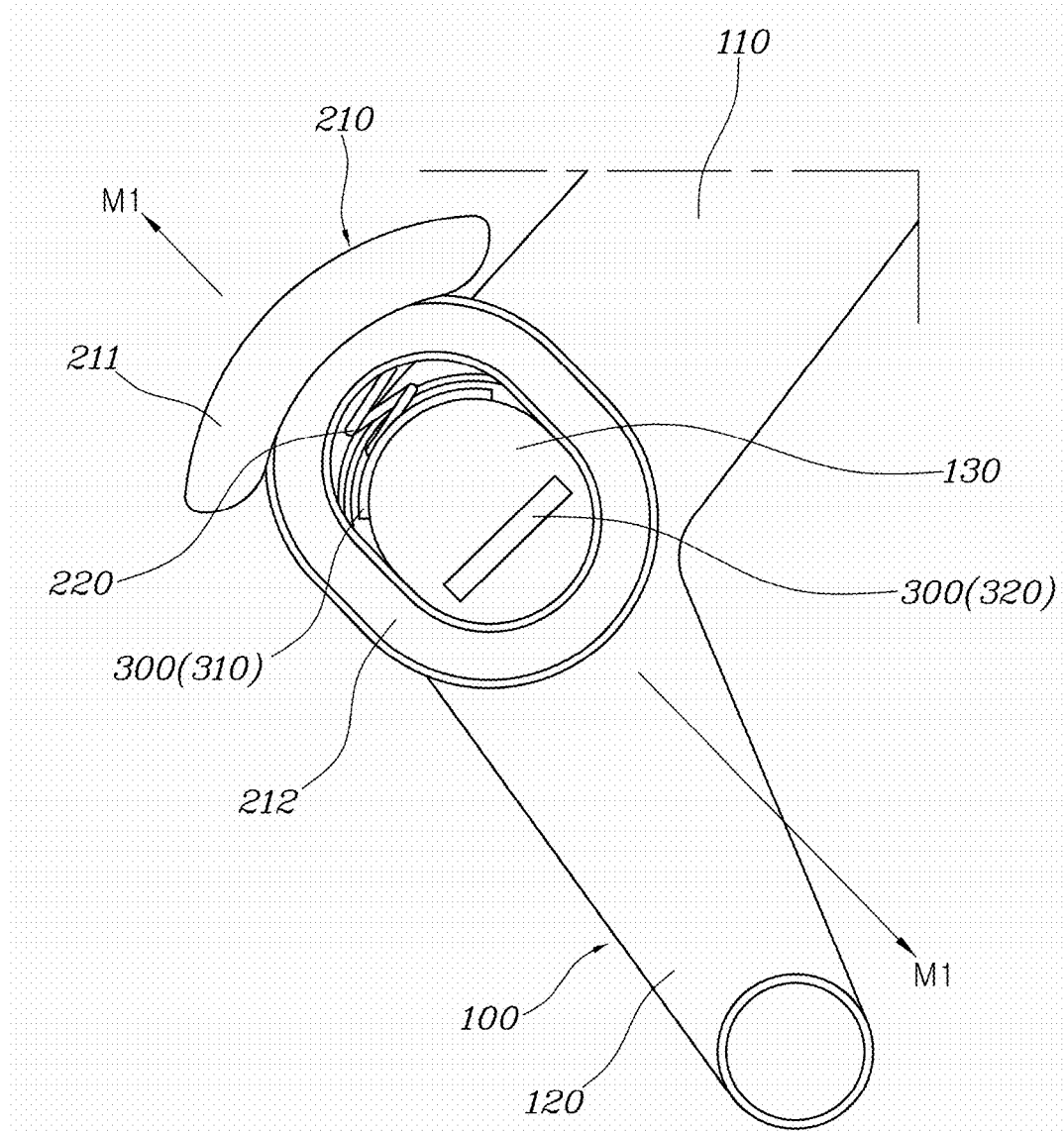
FIG. 6 is an enlarged side view exemplarily illustrating a portion to which a pedal pad is coupled.

When the pedal assembly 200 turns into the hide state, the pedal assembly 200 is covered by the center fascia panel 20, and accordingly, the pedal assembly 200 is not exposed to the eyes of the driver 30 or passenger inside the vehicle as illustrated in FIG. 4, having an advantage in that the vehicle interior may be maximized.

Furthermore, an exemplary embodiment of the present disclosure is configured to make the hide state with the pedal arm 100 and the pedal assembly 200 being located in a space between the footrest panel 10 and the center fascia panel 20, having an advantage in that a hiding space of the pedal arm 100 and the pedal assembly 200 may be minimized and that the interior and a power electronics room of the vehicle may be maximized.

When the pedal arm 100 rotates downwardly in the hide state, the pedal assembly 200 provided in the pedal arm 100 protrudes downward of the center fascia panel 20 to be exposed toward the driver, so that the foldable pedal apparatus turns into the pop-up state in which the pedal assembly 200 is manipulable by the driver.

Accordingly, the pedal assembly 200 is configured to move up to be exposed under the center fascia panel 20 from behind the center fascia panel 20 in a hidden state when the pedal assembly 200 turns into the pop-up state from the hide state, having an advantage in that the high-tech image may be maximized.

The center fascia panel 20 is rearwardly spaced from the footrest panel 10, and a support lever 40 is provided in the center fascia panel 20.

The support lever 40 is provided so that one end portion may elastically rotate up and down via a plurality of lever springs 41 and that the other end portion protrudes toward the footrest panel 10.

According to an exemplary embodiment of the present disclosure, when the pedal arm 100 rotates upward to be supported by the support lever 40, the pedal apparatus turns into the hide state in which the pedal assembly is not manipulable by the driver 200.

The support lever 40 needs to sufficiently support from below, with the elastic force of the lever spring 41 based on non-operation of the motor in the hide state, the pedal arm 100 to which the pedal assembly 200 is coupled.

When the pedal arm 100 rotates downwardly in the hide state to be detached from the support lever 40, the foldable pedal apparatus turns into the pop-up state in which the pedal assembly 200 is manipulable by the driver.

According to an exemplary embodiment of the present disclosure, the foldable pedal apparatus further includes a motor 400 fixed to the footrest panel 10 and coupled to the pedal arm 100 to rotate the pedal arm 100 during operation of the motor.

The motor shaft of the motor 400 is coupled to an upper end portion of the pedal arm 100 and a lower end portion of the pedal arm 100 is present as a free end portion so that the motor shaft and the pedal arm 100 integrally rotate.

The motor 400 is fixed to the footrest panel 10 via a bracket 410.

The pedal arm 100 includes a rotation portion 110 connected to the motor 400 at an upper end portion thereof, a support portion 120 bending from the rotation portion 110 to contact and be supported by a floor of the footrest panel 10 when the pedal assembly 200 is in the pop-up state, and a pair of shaft portions 130 which respectively protrude right and left at a connecting point between the rotation portion 110 and the support portion 120 and to which the pedal assembly 200 is operably coupled.

The motor 400 is connected to the upper end portion of the rotation portion 110, the support portion 120 bends from a lower portion of the rotation portion 110 at a predetermined angle to extend, and a pair of shaft portions 130 protrude right and left, respectively.

The support portion 120 contacts with and is supported by the floor of the footrest panel 10 when the pedal assembly 200 is in the pop-up state, and a fixing portion 11 for supporting the support portion 120 may be provided on the floor of the footrest panel 10.

The support portion 120 of the pedal arm 100 is supported by the fixing portion 11 provided on the floor of the footrest panel 10 when the pedal assembly 200 is in the pop-up state, and sufficient manipulating force may be secured by the supporting force of the support portion 120 and the fixing portion 11 when the driver steps on and manipulates the pedal assembly 200 in the pop-up state.

The support portion 120 of the pedal arm 100 bends to extend in a direction closest to an operating direction (arrow M1 in FIG. 6) of the pedal assembly 200 so that stable manipulating force may be secured when the driver steps on and manipulates the pedal assembly 200, and to the present end, the angle between the rotation portion 110 and the support portion 120 is as close to the right angle as possible.

When the pedal arm 100 rotate upward by the operation of the motor 400 and the support portion 120 is supported by the support lever 40 provided in the center fascia panel 20, the pedal assembly 200 is covered by the center fascia panel 20 to be hidden, and accordingly, turns into the hide in which the pedal assembly is not manipulable by the driver.

When the pedal arm 100 rotates downward by the operation of the motor 400 in the hide state and the support portion 120 contacts with and is supported by the floor of the footrest panel as described above, the pedal assembly 200 becomes exposed under the center fascia panel 20, and consequently, the pedal assembly is manipulable by the driver 200 in the pop-up state.

According to an exemplary embodiment of the present disclosure, the pedal assembly 200 includes two assemblies that have identical configurations and that are spaced from each other right and left of the pedal arm 100. Of the two pedal assemblies 200, one assembly is a pedal assembly 201 of an accelerator pedal apparatus generating a signal relating to acceleration of the vehicle during the manipulation by the driver, and the other assembly is a pedal assembly 202 of a brake pedal apparatus generating a signal relating to braking of the vehicle.

That is, according to an exemplary embodiment of the present disclosure, the pedal assembly 200 coupled to the shaft portion 130 on the right side of the pedal arm 100 is the pedal assembly 201 of the accelerator pedal apparatus generating a signal relating to acceleration during the manipulation by the driver and the pedal assembly 200 coupled to the shaft portion 130 on the left side of the pedal arm 100 is the pedal assembly 202 of the brake pedal apparatus generating a signal relating to braking of the vehicle.

According to an exemplary embodiment of the present disclosure, the pedal assembly 200 includes a pedal pad 210 fitted over the shaft portion 130 of the pedal arm 100 and manipulated by the driver, and a return spring 220 supported by the shaft portion 130 and the pedal pad 210 at either end portion to return the pedal pad 210.

The pedal pad 210 is manipulated straight in the manipulation direction M1 during the manipulation by the driver.

The pedal pad 210 includes a manipulation portion 211 manipulated by the driver to support one end portion of the return spring 220, and a housing portion 212 connected to the manipulation portion 211 and fitted over the shaft portion 130 to move straight with respect to the shaft portion 130 during the manipulation of the manipulation portion 211.

The manipulation portion 211 of the pedal pad 210 becomes a pad surface that the driver steps on and manipulates, and the housing portion 212 is formed in a shape of cylinder so that the shaft portion 130 of the pedal arm 100 is inserted through an internal diameter portion thereof.

The shaft portion 130 of the pedal arm 100 and the housing portion 212 of the pedal pad 210 have elliptical cross-sectional shapes, and the major axes extend in the manipulation direction M1 of the pedal pad 210. Accordingly, when the driver steps on and manipulates the pedal pad 210, the pedal pad 210 moves straight in the manipulation direction M1 instead of rotating with respect to the shaft portion 130.

Furthermore, the major axis of the elliptical cross-section of the housing portion 212 is greater than the major axis of the elliptical cross-section of the shaft portion 130 so that the housing portion 212 of the pedal pad 210 may move straight with respect to the shaft portion 130 of the pedal arm 100 when the driver steps on and manipulates the manipulation portion 211 of the pedal pad 210.

Here, the pedal pad 210 used as the pedal assembly 202 of the brake pedal apparatus is greater than the pedal 210 used as the pedal assembly 201 of the accelerator pedal apparatus. The present configuration allows the driver to manipulate the brake pedal more easily than the accelerator pedal so that a faulty manipulation may be prevented and the safety in pedal manipulation may be further improved.

The return spring 220 is configured to return the pedal pad 210 by spring force. The return spring 220 is compressed to build up elastic force when the pedal pad 210 moves forward by the manipulation of the driver and is decompressed to return the pedal pad 210 to the initial position when the pedal pad 210 is relieved of the manipulating force of the driver.

The return spring 220 includes compression coil springs, and the pedal assembly 201 of the accelerator pedal apparatus and the pedal assembly 202 of the brake pedal apparatus are respectively provided with two compression coil springs so that a fail-safe feature that ensures a normal operation in case one coil spring breaks down is provided.

Furthermore, pedal effort tuning is possible by tuning the spring force of the return spring 220, and the spring force of the two return springs 220 may be set differently to suppress fine vibrations of the pedal pad 210.

Figure 9:
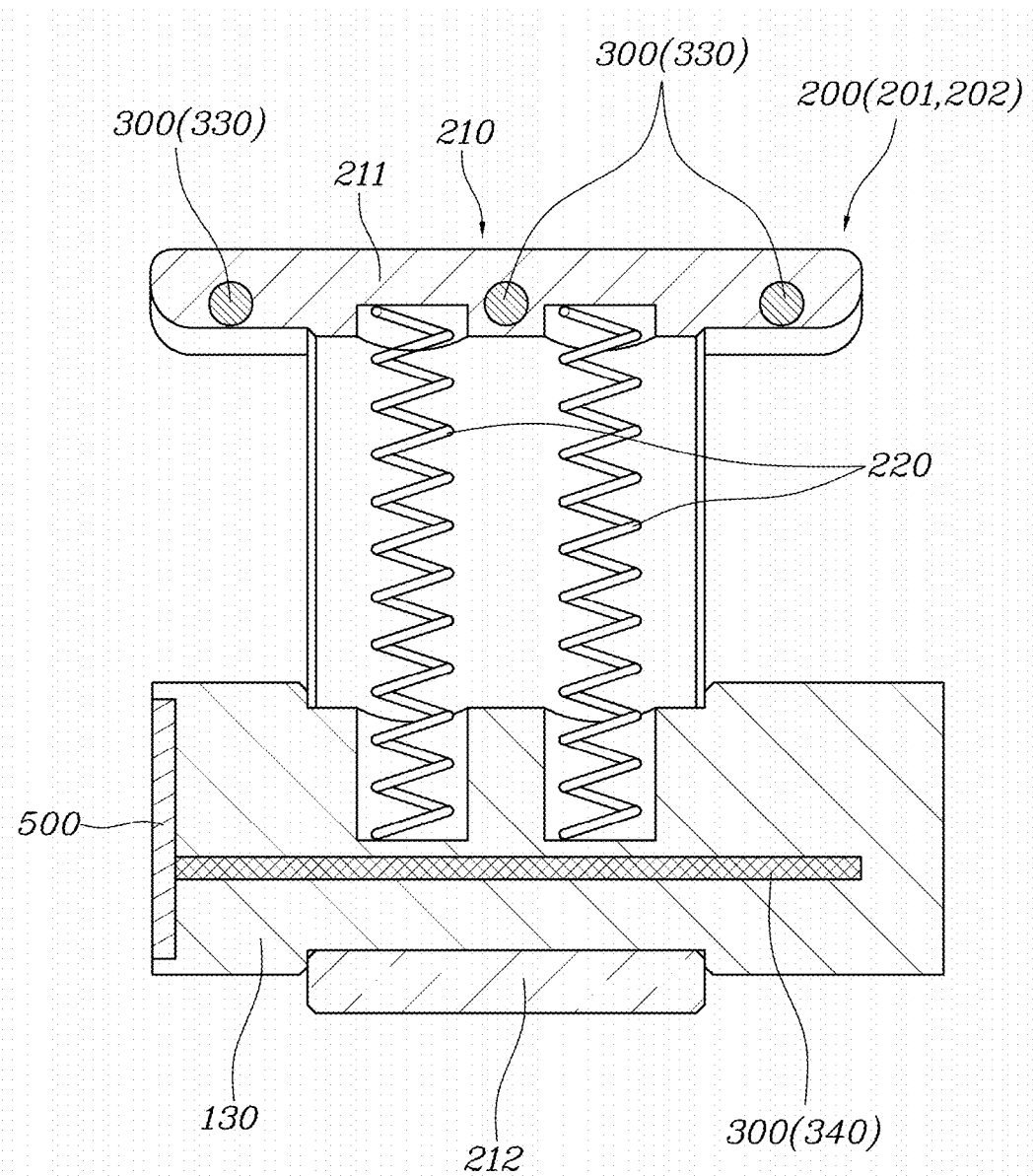
FIG. 9 is a view exemplarily illustrating a pedal assembly provided with a liner motion signal generating portion before an operation according to an exemplary embodiment of the present disclosure.
Figure 10:
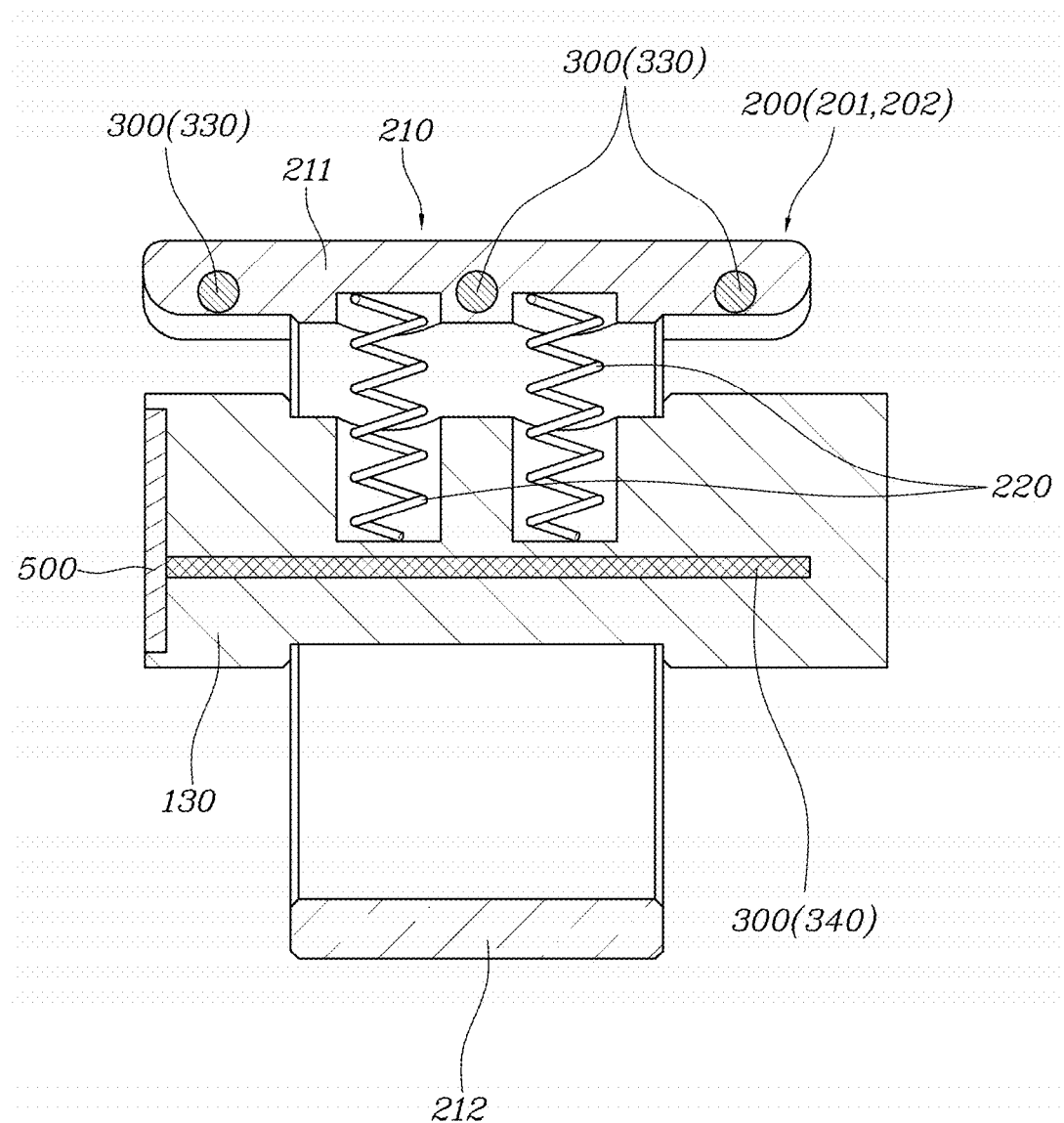
FIG. 10 is a view of the pedal assembly in FIG. 9 after the operation.

According to an exemplary embodiment of the present disclosure, the signal generating portion 300 is configured in two ways. The various exemplary embodiments employs a pressure operation method as illustrated in FIGS. 1 to 8, and the various exemplary embodiments employs a linear operation method as illustrated in FIG. 9 and FIG. 10.

First, the signal generating portion 300 includes a pressure sensor 310 fixed to the shaft portion 130 of the pedal arm 100 to generate an electrical signal upon contacting with the manipulation portion 211 by the manipulation of the pedal pad 210, and a printed circuit board (PCB) 320 fixed to the shaft portion 130 to generate a signal relating to the pedal function upon receiving a signal of the pressure sensor 310.

The PCB 320 provided in the pedal assembly 201 of the accelerator pedal apparatus is configured to generate a signal relating to acceleration upon receiving an electrical signal of the pressure sensor 310, and the PCB 320 provided in the pedal assembly 202 of the brake pedal apparatus is configured to generate a signal relating to braking upon receiving an electrical signal of the pressure sensor 310.

The return spring 220 is supported by the manipulation portion 211 of the pedal pad 210 at one end portion thereof and the shaft portion 130 of the pedal arm 100 at the other end portion through the pressure sensor 310.

Furthermore, a hole of a predetermined size is formed in the pressure sensor 310 for installing the return spring 220, which is provided through the hole of the pressure sensor 310. The return spring 220 is provided such as not to interfere with the pressure sensor for the stable operation of the pressure sensor 310 and that, to the present end, the hole formed in the pressure sensor 310 is large enough for the pressure sensor 310 not to contact with the return spring 220.

Figure 7:
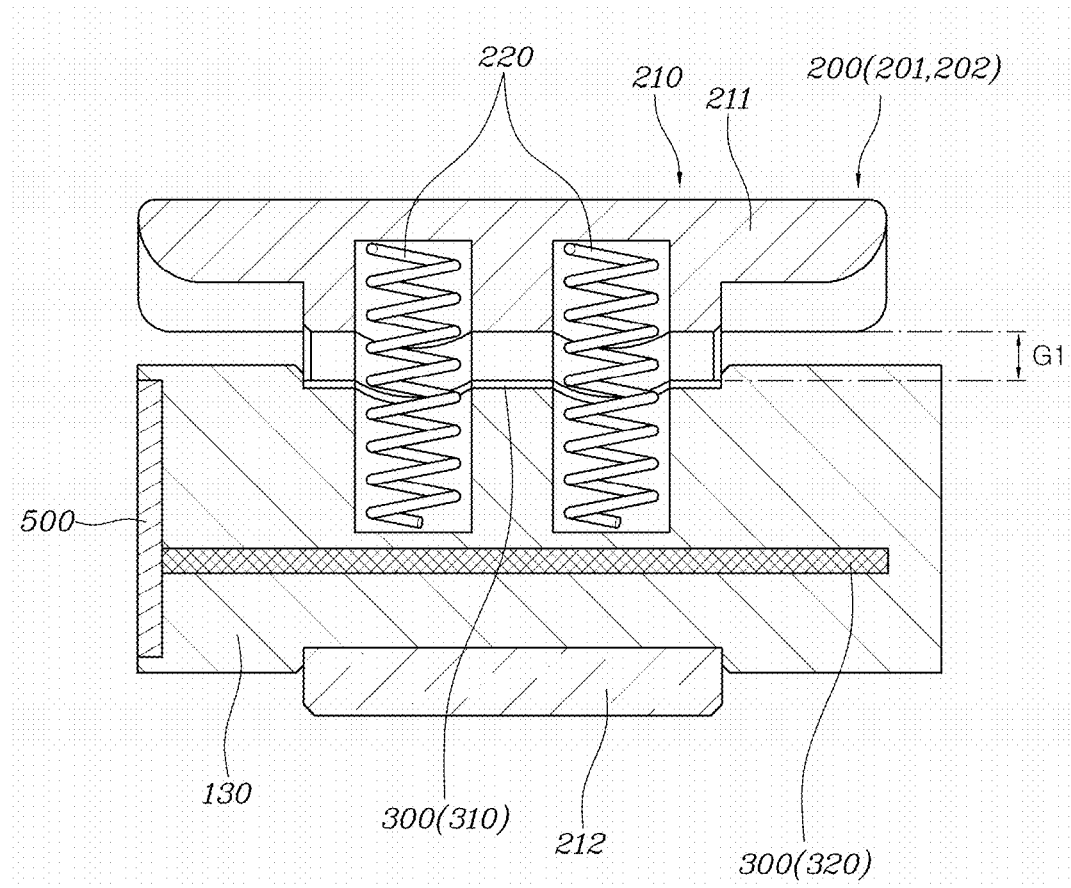
FIG. 7 is a view exemplarily illustrating a pedal assembly provided with a pressure-operated signal generating portion before an operation according to an exemplary embodiment of the present disclosure.
Figure 8:
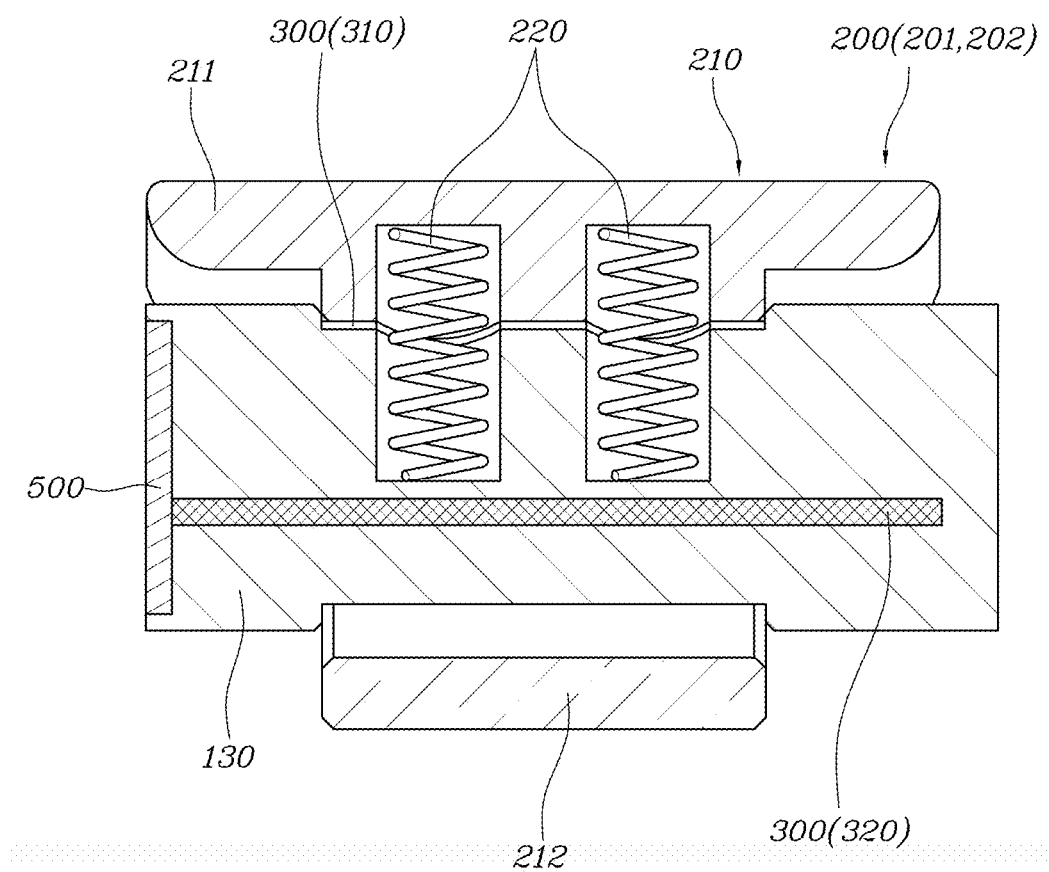
FIG. 8 is a view of the pedal assembly in FIG. 7 after the operation.

According to an exemplary embodiment of the present disclosure, as illustrated in FIG. 7, the foldable pedal apparatus is provided with an air gap G1 of a predetermined depth between the manipulation portion 211 of the pedal pad 210 and the pressure sensor 310, a depth of the air gap being predetermined based on non-manipulation of the pedal pad 210 by the driver.

Next, as illustrated in FIG. 9 and FIG. 10, the signal generating portion 300 of the linear operation type includes a plurality of permanent magnets 330 coupled to the manipulation portion 211 of the pedal pad 210 and a printed circuit board (PCB) 340 coupled to the shaft portion 130 of the pedal arm 100 to face the permanent magnets 330, wherein the PCB 340 recognizes changes in magnetic flux of the permanent magnet 330 when the pedal pad 210 moves by the manipulation of the drivers and generates a signal relating to the pedal function of the vehicle.

At the present time, the PCB 340 provided in the pedal assembly 201 of the accelerator pedal apparatus is configured to generate a signal relating to acceleration, and the PCB 340 provided in the pedal assembly 202 of the brake pedal apparatus is configured to generate a signal relating to braking of the vehicle.

According to an exemplary embodiment of the present disclosure, the PCB 320, 340 is inserted into the shaft portion 130 of the pedal arm 100 for installation and is protected by the shaft portion 130, and a cover 500 sealing the opening hole of the shaft portion 130 may be coupled to one end portion of the shaft portion 130 to prevent a detachment of the PCB 320, 340.

According to an exemplary embodiment of the present disclosure, as described above, the foldable pedal apparatus is configured to turn into the pop-up state in which the pedal pad 210 may move up to protrude to the interior of the vehicle and be exposed toward the driver so that the pedal pad 210 is manipulable by the driver in a manual driving mode in which the driver is actively engaged in driving and the hide state in which the pedal pad 210 is pushed behind the center fascia panel 20 so that exposure toward the driver is blocked so that the pedal pad 210 is not manipulable by the driver in an autonomous driving mode in which the driver is not actively engaged in driving, having the effect that the driver may rest in comfort in the autonomous driving mode, and furthermore, that safety may be improved by blocking a faulty manipulation of the pedal in the autonomous driving mode.

Furthermore, according to an exemplary embodiment of the present disclosure, the foldable pedal apparatus is configured to generate a signal relating to the pedal function using the pressure-operated sign generating portion 300 or liner motion sign generating portion 300, having the effect of promoting a cost cut by decreasing the number of parts and downsizing through a compact configuration.

Furthermore, according to an exemplary embodiment of the present disclosure, the foldable pedal apparatus is configured to perform the pop-up operation and hide operations using the pedal arm 100 rotating with respect to the footrest panel 10 and the support lever 40 provided in the center fascia panel 20, having the effect that the interior of the vehicle may be maximized by minimizing the space required for the pop-up operation and that the high-tech image may be heightened at the time of pop-up operation.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
    a pedal arm rotatably provided in a footrest panel;
    a pedal assembly provided in the pedal arm and operated in response to manipulation of a driver; and
    a signal generating portion provided in the pedal assembly to generate a signal relating to a pedal function during operation of the pedal assembly,
    wherein the foldable pedal apparatus turns into a hide state in which the pedal assembly is not manipulable by the driver when the pedal assembly is covered by a center fascia panel by rotation of the pedal arm and turns into a pop-up state in which the pedal assembly is manipulable by the driver when the pedal assembly is exposed from the center fascia panel by rotation of the pedal arm,
    wherein the center fascia panel is rearwardly spaced from the footrest panel with a predetermined gap,
    wherein a support lever is provided to protrude toward the footrest panel and be elastically rotatable via a lever spring elastically supporting the support lever in the center fascia panel, and
    wherein the foldable pedal apparatus turns into the hide state in which the pedal assembly is not manipulable by the driver when the pedal arm rotates upward to be supported by the support lever.

2. The foldable pedal apparatus of claim 1, wherein the foldable pedal apparatus turns into the pop-up state in which the pedal assembly is manipulable by the driver when the pedal arm rotates downward to be released from the support lever.

3. The foldable pedal apparatus of claim 1,
    wherein the pedal assembly includes first and second pedal assemblies that have identical configurations and that are spaced apart in a first direction and in a second direction of the pedal arm, and
    wherein, the first pedal assembly is a pedal assembly of an accelerator pedal apparatus generating a signal relating to acceleration of the vehicle during manipulation thereof by the driver, and the second pedal assembly is a pedal assembly of a brake pedal apparatus generating a signal relating to braking of the vehicle.

4. The foldable pedal apparatus of claim 1, further including a motor fixed to the footrest panel and coupled to the pedal arm to rotate the pedal arm during operation of the motor.

5. The foldable pedal apparatus of claim 4, wherein the pedal arm includes:
    a rotation portion connected to the motor at an upper end thereof;
    a support portion bending from the rotation portion to contact, and be supported, by a floor of the footrest panel when the pedal assembly is in the pop-up state; and
    a pair of shaft portions which respectively protrude in a first direction and in a second direction from a connecting point between the rotation portion and the support portion and to which the pedal assembly is operably coupled.

6. The foldable pedal apparatus of claim 5,
    wherein the support lever is provided to be rotatable via the lever spring elastically supporting the support lever in the center fascia panel, and
    wherein the foldable pedal apparatus turns into the hide state in which the pedal assembly is not manipulable by the driver when the pedal arm rotates upward so that the support portion is supported by the support lever.

7. The foldable pedal apparatus of claim 5,
    wherein the support lever is provided to be rotatable via the lever spring in the center fascia panel, and
    wherein the foldable pedal apparatus turns into the pop-up state in which the pedal assembly is manipulable by the driver when the pedal arm rotates downward so that the support portion is supported by the floor of the footrest panel.

8. The foldable pedal apparatus of claim 5,
    wherein the pedal assembly includes first and second pedal assemblies that have identical configurations and that are respectively coupled to the shaft portions of the first and second pedal assemblies, and
    wherein the first pedal assembly coupled to the shaft portion on the first direction is a pedal assembly of an accelerator pedal apparatus generating a signal relating to acceleration of the vehicle during manipulation thereof by the driver, and the second pedal assembly coupled to the shaft portion on the second direction is a pedal assembly of a brake pedal apparatus generating a signal relating to braking of the vehicle.

9. The foldable pedal apparatus of claim 5,
    wherein the pedal assembly includes:
        a pedal pad fitted over a corresponding shaft portion among the shaft portions to be manipulated by the driver; and a return spring supported by the corresponding shaft portion and the pedal pad to elastically support the pedal pad, wherein the pedal pad is manipulated to move straight in a manipulation direction of the driver.

10. The foldable pedal apparatus of claim 9, wherein the pedal pad includes:

a manipulation portion which is a part manipulated by the driver and by which the return spring is supported at an end thereof; and a housing portion connected to the manipulation portion and fitted over the corresponding shaft portion to move straight with respect to the corresponding shaft portion during manipulation of the manipulation portion.

11. The foldable pedal apparatus of claim 10, wherein the corresponding shaft portion and the housing portion have elliptical cross-sections and major axes thereof extend in the manipulation direction of the pedal pad, and wherein the major axis of the elliptical cross-section of the housing portion is greater than the major axis of the elliptical cross-section of the corresponding shaft portion so that the housing portion moves straight with respect to the corresponding shaft portion during the manipulation of the manipulation portion.

12. The foldable pedal apparatus of claim 10, wherein the signal generating portion includes:

a pressure sensor fixed to the corresponding shaft portion to generate an electrical signal upon contacting with the manipulation portion in response to manipulation of the pedal pad; and a printed circuit board (PCB) fixed to the corresponding shaft portion to generate a signal relating to the pedal function upon receiving the electrical signal of the pressure sensor.

13. The foldable pedal apparatus of claim 12, wherein an air gap is provided between the manipulation portion of the pedal pad and the pressure sensor, a depth of the air gap being predetermined based on non-manipulation of the pedal pad by the driver.

14. The foldable pedal apparatus of claim 12, wherein the PCB is inserted into the corresponding shaft portion, and wherein a cover sealing an opening hole of the corresponding shaft portion is coupled to one end portion of the corresponding shaft portion to prevent detachment of the PCB from the corresponding shaft portion.

15. The foldable pedal apparatus of claim 10, wherein the signal generating portion includes:

a permanent magnet coupled to the manipulation portion of the pedal pad; and a printed circuit board (PCB) coupled to the corresponding shaft portion to face the permanent magnet, wherein the PCB is configured to recognize changes in magnetic flux of the permanent magnet when the pedal pad moves by manipulation of the driver and generates a signal relating to the pedal function of the vehicle.

16. The foldable pedal apparatus of claim 15, wherein the PCB is inserted into the corresponding shaft portion, and wherein a cover sealing an opening hole of the corresponding shaft portion is coupled to one end portion of the corresponding shaft portion to prevent detachment of the PCB from the corresponding shaft portion.

17. The foldable pedal apparatus of claim 10, wherein the return spring is supported by the manipulation portion at a first end portion of the return spring and supported by the corresponding shaft portion at a second end portion of the return spring through the pressure sensor so that the return spring is provided not to interfere with the pressure sensor.

18. The foldable pedal apparatus of claim 5, wherein the support portion of the pedal arm extends in a direction closest to an operating direction of the pedal assembly when the support portion of the pedal arm contacts with and is supported by the floor of the footrest panel.

19. A foldable pedal apparatus for a vehicle, the foldable pedal apparatus comprising:

a pedal arm rotatably provided in a footrest panel;

a pedal assembly provided in the pedal arm and operated in response to manipulation of a driver;

a signal generating portion provided in the pedal assembly to generate a signal relating to a pedal function during operation of the pedal assembly; and a motor fixed to the footrest panel and coupled to the pedal arm to rotate the pedal arm during operation of the motor, wherein the foldable pedal apparatus turns into a hide state in which the pedal assembly is not manipulable by the driver when the pedal assembly is covered by a center fascia panel by rotation of the pedal arm and turns into a pop-up state in which the pedal assembly is manipulable by the driver when the pedal assembly is exposed from the center fascia panel by rotation of the pedal arm, and wherein the pedal arm includes:

a rotation portion connected to the motor at an upper end thereof;

a support portion bending from the rotation portion to contact, and be supported, by a floor of the footrest panel when the pedal assembly is in the pop-up state; and a pair of shaft portions which respectively protrude in a first direction and in a second direction from a connecting point between the rotation portion and the support portion and to which the pedal assembly is operably coupled.

\* \* \* \* \*